C. G. HUELVES.
MACHINE FOR PICKING AND CUTTING CANE STRAW AND PLOWING UNDER THE SAME.
APPLICATION FILED JAN. 29, 1919.
1,374,149.
Patented Apr. 5, 1921.
4 SHEETS—SHEET 3.
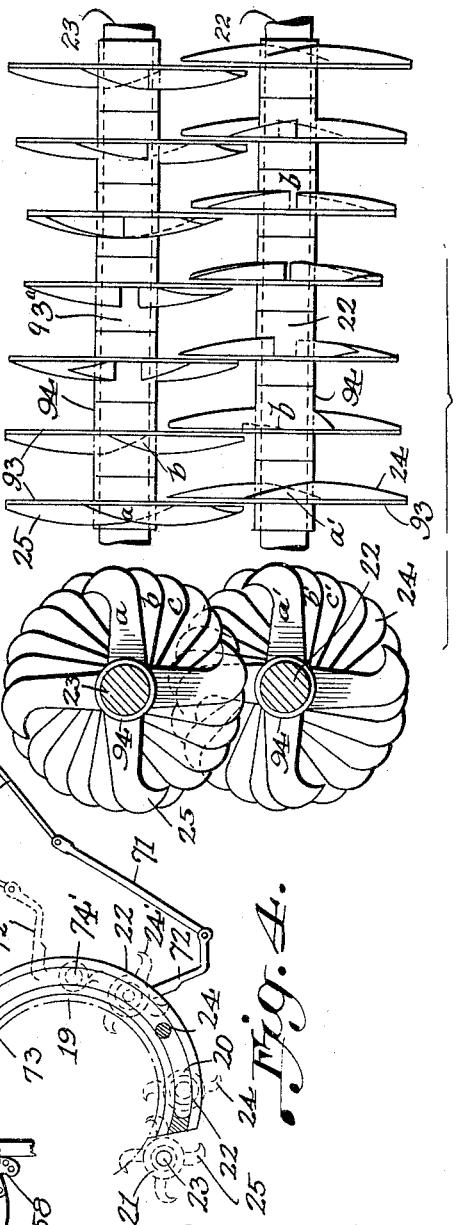
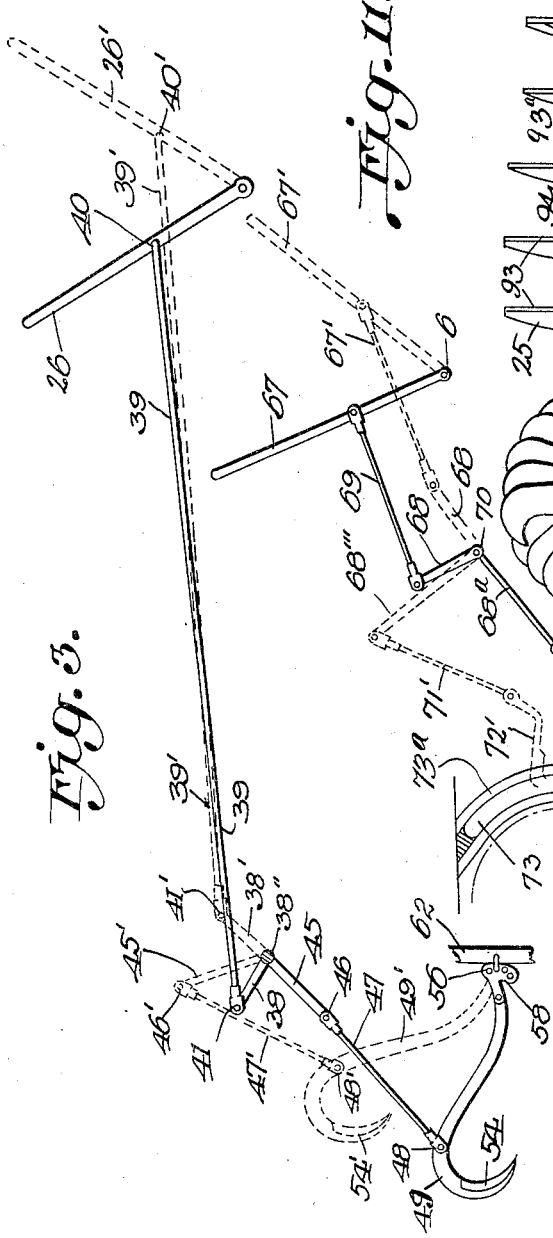

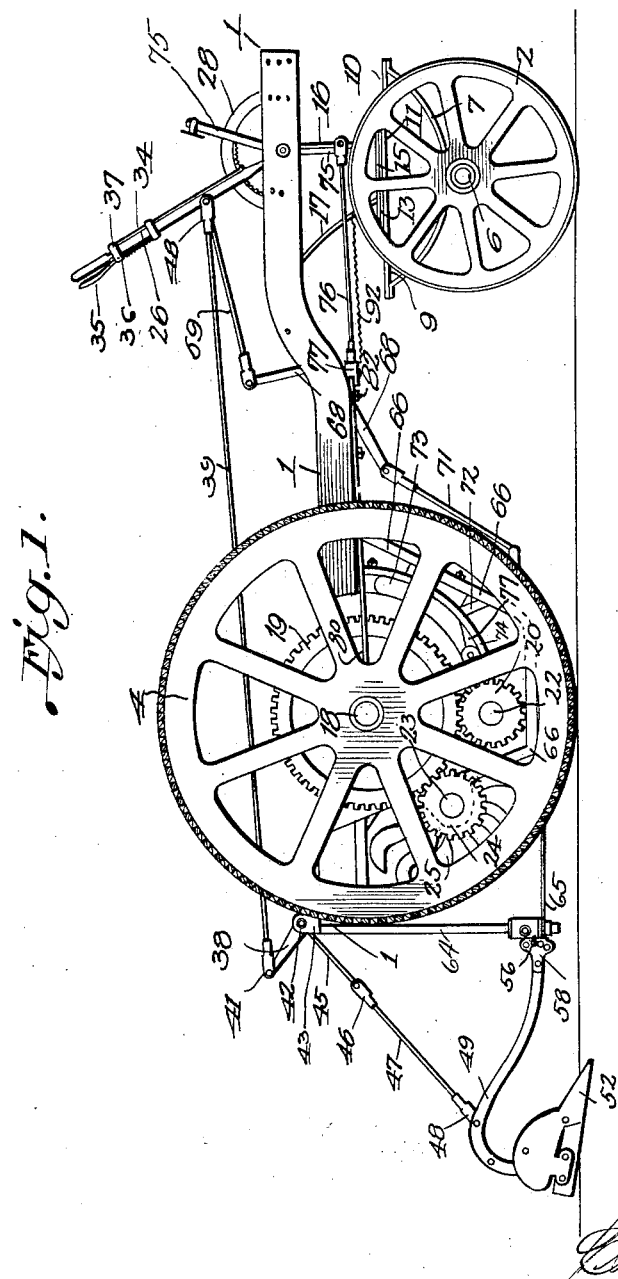

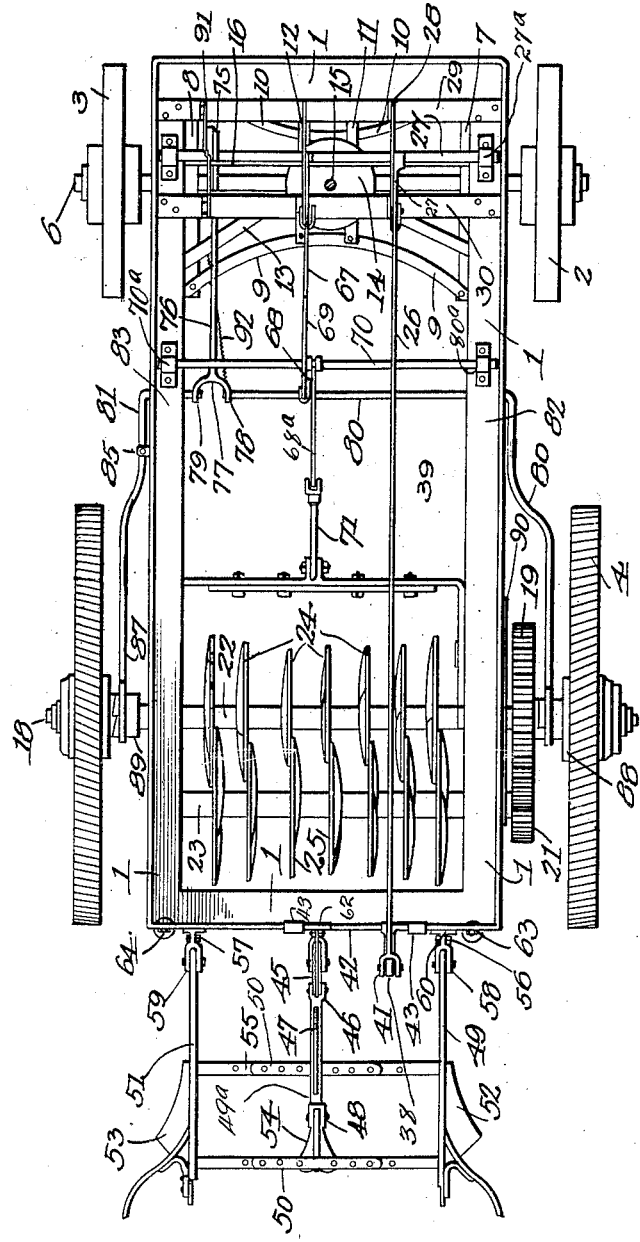

C. G. HUELVES.
MACHINE FOR PICKING AND CUTTING CANE STRAW AND PLOWING UNDER THE SAME.
APPLICATION FILED JAN. 29, 1919.
1,374,149.
Patented Apr. 5, 1921.
4 SHEETS—SHEET 4.
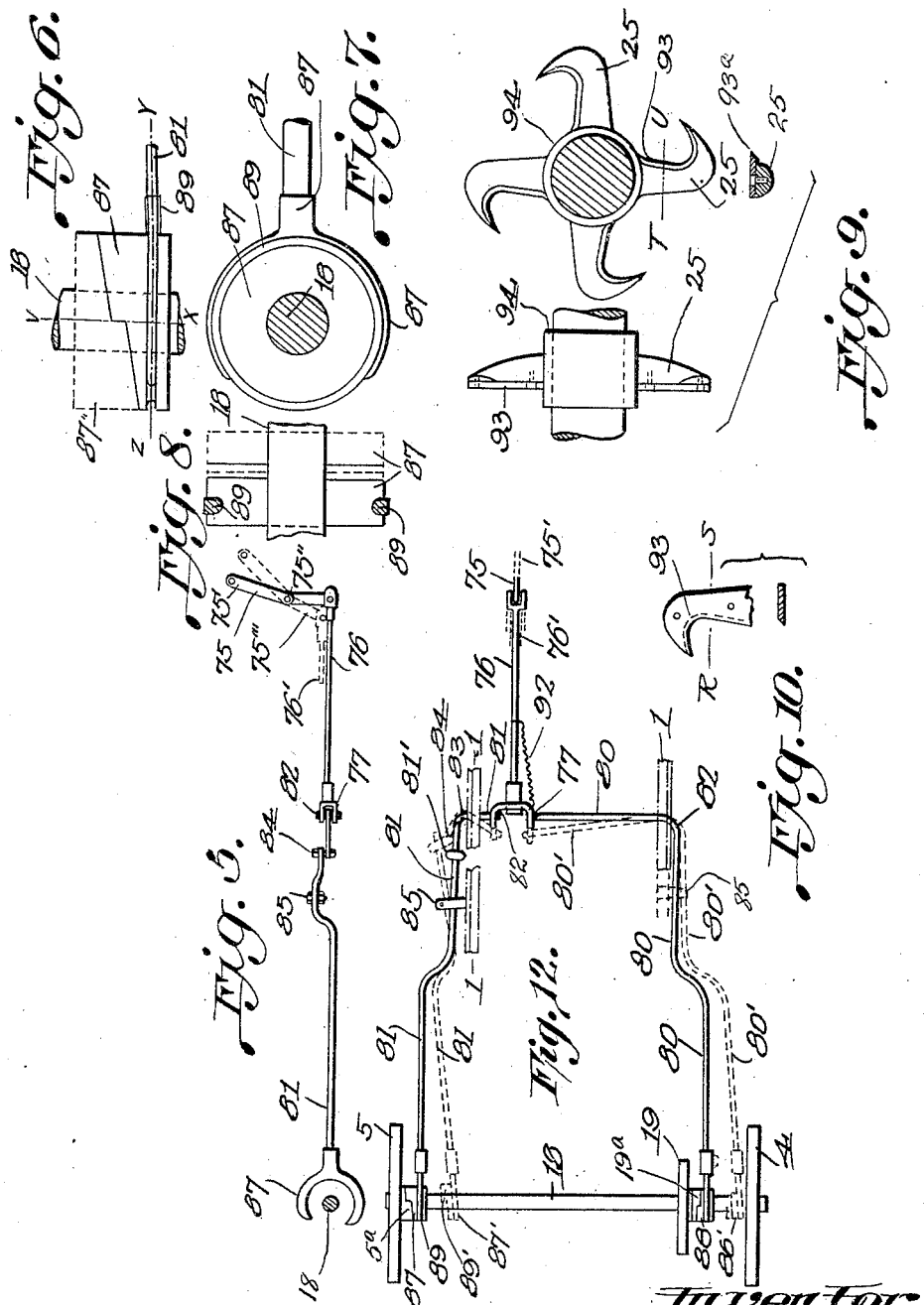

UNITED STATES PATENT OFFICE.

CLAUDIO GARCIA HUELVES, OF SANTA CLARA, CUBA.

MACHINE FOR PICKING AND CUTTING CANE-STRAW AND PLOWING UNDER THE SAME.

1,374,149. Specification of Letters Patent. Patented Apr. 5, 1921.

Application filed January 29, 1919. Serial No. 273,856.

*To all whom it may concern:*

Be it known that I, CLAUDIO GARCIA HUELVES, a citizen of the Republic of Cuba, and a resident of the city of Santa Clara, Cuba, have invented Improved Machines for Picking and Cutting Cane-Straw and Plowing Under the Same, of which the following is a specification.

This invention relates to improvements in cane straw picking, cutting and plowing machines, the object of the invention being to provide an improved machine of this character which is especially adapted to pick up and cut straw or the like, especially cane straw, and to plow the same under and thereby fertilize the soil therewith.

One object of the present invention is to effect improvements in the construction of the straw picking and cutting mechanism.

Another object is to effect improvements in the relative arrangement of the cutting mechanism and the plows, to facilitate the operation of the plows in hilling up or ridging the soil and in burying the cut straw thereunder.

With the above and other objects in view, the invention consists in the construction, combination and arrangement of devices hereinafter described and claimed.

In the accompanying drawings:—

Figure 1 is a side elevation of a straw cutting and plowing machine constructed and arranged in accordance with my invention.

Fig. 2 is a plan of the same.

Fig. 3 is a detail elevation of one of the plows and the means for raising and lowering the same.

Fig. 4 is a similar view of the means for shifting one set of the revoluble cutters toward and from the other set.

Fig. 5 is a detail elevation, partly in section, of one of the clutch mechanisms for putting the machine in and out of gear.

Fig. 6 is a detail plan of one of the clutches.

Fig. 7 is a detail elevation of the same, with the rear axle shaft shown in cross section.

Fig. 8 is a rear elevation of the same with one of the shipper levers indicated in transverse section.

Fig. 9 is a series of views in detail of one of the revoluble cutters, in rear elevation, side elevation, and detail cross section, respectively.

Fig. 10 is a detail elevation and also a detail cross section of one of the cutter blades.

Fig. 11 shows the two sets of revoluble cutters in side elevation and in rear elevation.

Fig. 12 is a detail plan of the clutch mechanisms.

The frame 1 may be of any suitable construction and is here shown as of oblong rectangular form and as composed of angle iron. The front truck comprises the front axle 6 and the front wheels 2, 3. Semi-elliptic springs 7, 8, have their central portions secured on the axle 6 and their upper ends respectively connected by curved bars 9, 10. These bars are connected together by cross bars 11, 12. A fifth wheel comprises a lower disk 13 which is secured on the cross bars and an upper disk 14 which is connected to the front portion of the frame 1 by bolster irons 16, 17. The usual king bolt is indicated at 15. Hence the front truck can be turned in any direction. In practice the front truck is provided with a suitable tongue to enable the machine to be drawn by a team or a tractor.

The rear axle shaft 18 is mounted in suitable bearings with which the frame 1 is in practice provided. On the ends of the rear axle are the rear wheels 4, 5, the wheel 4 being fast and the wheel 5 being loose. The wheel 5 has a clutch element $5^a$. A spur gear 19 of suitable size is loose on the rear axle and has a clutch element $19^a$. A clutch element 87 is shiftable into and out of gear with the clutch element $5^a$, and a clutch element 88 is shiftable into and out of gear with the clutch element $19^a$. Hence the wheels 5, 19, may be locked to the rear axle when required. The rear wheels have ribbed peripheries as shown in Figs. 1 and 2, to prevent them from slipping in the soil.

Shipper levers 80, 81, are respectively provided for the clutch members 86, 87, and have fork arms 88, 89, respectively, at their rear ends which engage in the usual annular grooves with which said clutch members are provided. Said shipper levers are respectively pivotally mounted on the main frame 1 as at 85, and have their front ends, which are turned inwardly, pivotally connected to a yoke 82 at the rear end of a rod 76. Said rod is pivotally connected at its front end to the lower end of a foot lever 75. Hence the operator stationed on a seat (not shown) by movement of one foot can throw the wheels 5, 19, into gear. A spring 92 is connected to the yoke and also to the member 17 and serves to normally hold the clutch members 87, 88, out of gear with the clutch members 5ª, 19ª, respectively.

A hanger frame 66 is secured to and depends from the rear portion of the frame 1, and has bearings for a relatively fixed cutter shaft 23. Said cutter shaft is hence mounted for rotation and is provided with a spur gear 24 which engages the gear wheel 19. Revoluble cutters are arranged on the shaft 23, each of said cutters comprising a hub 94, arms 25, and a cutter blade 93. Each arm 25 is shaped like a hook and is flat on one side. Each cutter blade is also shaped like a hook and is somewhat wider than the arm on the flat side of which it is secured, the cutting edge 93ª of the blade projecting in advance of the arm to which said blade is secured, as shown, and being beveled on one side and sharpened. Any suitable number of these cutters may be provided, and they are secured to the shaft to rotate therewith.

A shiftable revoluble cutter shaft 22 is also provided, and said shiftable shaft is mounted in segmental bearings 74 which are slidable in the arcuate guide slots 73 of guide hangers 73ª which are secured to and depend from the frame and are concentric with the rear axle 18 and the spur gear 19 as indicated in Figs. 1 and 4. Each shiftable bearing has an arm 72. The said arms 72 are pivotally connected to the lower rear ends of a yoke 71. Said yoke is pivotally connected to an arm 68ª, which projects radially from a rock shaft 70. Said rock shaft is mounted in bearings 70ª on the frame 1, and also has a rock arm 68. Said rock arm is connected by a rod 69 to a hand lever 67, the lower end of said hand lever being pivotally mounted on a cross bar 30 of the frame 1. The cutters on the shiftable shaft 22 are indicated at 24, and also comprise members 93, 93ª, and 94 identical in construction with those previously described. Said shaft 22 also has a spur gear 20 which engages the spur gear 19. Hence when the machine is in gear, both sets of the revoluble cutters are simultaneously driven and when the shaft 22 is lowered its cutters describe circular paths which are intersected by those of the cutters 25, said cutters 24 being in contact with one side of the cutters 25. Owing to the hook shape of the cutters they serve to pick up prostrate straws, stalks, and the like, from the ground and to also cut the same into short lengths. Each cutter of one shaft coacts with a cutter of the other shaft and the straws or stalks are subjected to shearing action between the cutters as will be understood.

These cutters are described and claimed in my copending application for Letters Patent of the United States, Serial No. 273,855, filed January 29, 1919. Within the scope of the present invention any suitable cutters may be employed.

Oppositely outwardly turned hilling or covering plows 52, 53, have their respective beams 49, 51, pivotally connected at their front ends to the lower portions of standards 63, 64, which are secured to and depend from the rear end of the frame 1, the clevises of said plows, which form their pivotal connections being indicated at 58, 59, respectively, and each clevis having the usual plurality of pivotal openings 56 to enable said plow beams to be hitched or adjusted as may be required. A similar standard 62 also depends from the central portion of the rear end of the frame 1 and to its lower portion is pivotally connected the front end of the beam 49ª of a centrally arranged hilling plow 54 which is midway between and spaced from the plows 52, 53. Said plow 54 has cross links 50 on the upper side of its beam and which are connected to links 55 with which the plows 52, 53 are provided, said links 50, 55, being arranged in overlapping relation and being secured together at any desired adjustment by means of suitable bolts which fit in adjusting openings with which said links are provided. A rock shaft 42 is mounted in bearings 43 on the rear end of frame 1, and is provided with rock arms 38, 41. The rock arm 38 has associated therewith and at an angle thereto, a rock arm 45 which is connected by a rod 47 to the center plow 54, the pivotal connections of said rod 47 being shown at 46, 48. A rod 39 has its rear end provided with a fork 41 which is pivotally connected to the rock arm 38. The front end of said rod is pivotally connected to a hand lever 26, said hand lever extending from a rock shaft 27 which is mounted in bearings 27ª on the front portion of the frame 1. A segment 28 is provided to which the hand lever 26 may be secured by a suitable dog at any desired adjustment. It will be understood that by means of the said hand lever and the connections hereinbefore described, the plows may be raised and lowered at will and hence may be entirely disengaged from the soil or may be adjusted to operate at any desired depth in the soil.

It will be observed by reference to Fig. 2, that the cutters operate to pick up and cut the straws or stalks in the spaces between the plows, and hence the cut straws or stalks are buried in the soil turned by the plows in forming the hills or ridges.

While I have herein shown and described a preferred embodiment of my invention, I will have it understood that changes may be made in the form, construction and arrangement of the several parts, without departing from the spirit of my invention, and within the scope of the appended claims.

Having thus described my invention, I claim:—

1. In a straw picking and cutting machine, a wheeled frame, a spur gear, means to cause said spur gear to be rotated when the frame is in motion, a set of cutters mounted for rotation in relatively fixed bearings and having a gear engaging the first named gear, a shiftable shaft, a second set of cutters mounted thereon, a gear on said shiftable shaft engaging the first named gear, guide elements carried by the frame and having curved slots concentric with the first named gear, bearings for the shiftable shaft and mounted for movement in said slots, a lever, and connections between said lever and said bearings to enable said shiftable shaft to be moved by said lever to cause the second set of cutters to be moved toward and from the first named set of cutters.

2. In a straw picking and cutting machine, a wheeled frame, a spur gear, means to cause said spur gear to be rotated when the frame is in motion, a set of cutters mounted for rotation in relatively fixed bearings and having a gear engaging the first named gear, a shiftable shaft, a second set of cutters mounted thereon, a gear on said shiftable shaft engaging the first named gear, guide elements carried by the frame and having curved slots concentric with the first named gear, bearings for the shiftable shaft and mounted for movement in said slots, and means to adjust said bearings and thereby move the second set of cutters toward and from the first named set of cutters.

3. In a straw picking and cutting machine, a frame, an axle shaft therefor having supporting wheels, spaced plows attached to said frame to be drawn thereby, two sets of cutters arranged in advance of the plows and between the paths of movement thereof, said cutters being mounted for rotation and being arranged side by side, substantially in mutual contact and for rotation in intersecting paths, said cutters having shafts forming their axes and geared to said axle shaft, one of said cutter shafts having fixed bearings and the other having bearings mounted for movement in a path concentric with the axle shaft, and means to shift said movably mounted cutter shaft.

CLAUDIO GARCIA HUELVES.